United States Patent

Ebersohl

[15] 3,651,375

[45] Mar. 21, 1972

[54] PROTECTIVE CIRCUIT FOR A THYRISTOR TYPE SWITCH

[72] Inventor: Gerard Ebersohl, Aix-les-Bains, France

[73] Assignee: Compagnie Generale D'Electricite, Paris, France

[22] Filed: May 8, 1970

[21] Appl. No.: 35,799

[30] Foreign Application Priority Data

May 8, 1969 France ..................................6914830

[52] U.S. Cl. ..........................317/11 E, 307/202, 307/252 N, 307/252 T, 307/314, 317/33 SC, 317/43, 317/DIG. 6, 323/43.5 S

[51] Int. Cl. ...................H02h 3/00, H02h 7/00, H03k 17/00

[58] Field of Search..................307/202, 252 N, 252 T, 314; 317/33 SC, 43, 11 E; 323/43.5 S, 43.5 R

[56] References Cited

UNITED STATES PATENTS

| | | | |
|---|---|---|---|
| 3,531,713 | 9/1970 | Goldberg et al. | 323/43.5 S |
| 3,416,002 | 12/1968 | Faust | 307/202 |
| 3,431,436 | 3/1969 | King | 307/314 X |

*Primary Examiner*—John Zazworsky
*Attorney*—Sughrue, Rothwell, Mion, Zinn & Macpeak

[57] ABSTRACT

The invention concerns a protection device for a thyristor type switch comprising a protection circuit consisting of two Zener diodes of opposite conductivity in series with each other and in parallel with the thyristor type switch. In addition a reactance which can be saturated and has slight magnetic losses is connected in series with the thyristor type switch and thus in parallel with the Zener diodes. In modifications of the basic invention a capacitor is connected in parallel with both the lead containing the thyristor and reactance and with the Zener diodes. Finally, a resistor can be connected to the lead containing the thyristor and reactance. The invention is applied in particular to synchronous transformer tap changing switches.

8 Claims, 2 Drawing Figures

PROTECTIVE CIRCUIT FOR A THYRISTOR TYPE SWITCH

BACKGROUND OF THE INVENTION

The invention concerns switches comprising thyristors, such as those employed, for example, in synchronous on-load tap-changing switches for transformers.

For protecting thyristor switches against over-voltages, it is known to connect in parallel with these switches a protective circuit consisting of two series-connected Zener diodes of opposite directions.

The disadvantage of such a system is that deterioration of thyristors has been observed due to the fact that an inversely loaded Zener diode has a certain capacitance which may be 0.2 $\mu$f. This capacitance, which is charged at voltages which are sometimes higher than 1,000 v., discharges into one of the thyristors, which undergoes a deterioration due to this rapid current change, because the discharge circuit has very low resistance.

SUMMARY OF THE INVENTION

The invention relates to an arrangement for protecting the thyristor switch against this discharge of the capacitance of the Zener diodes of the protective circuit. It is distinguished notably by the fact that a saturable reactor having low magnetic losses is connected in series with the thyristors, the protective circuit being in parallel with the assembly comprising the thyristors and the coil.

In accordance with one embodiment of the invention, the aforesaid saturable reactor comprises a magnetic core consisting of ferrite.

In accordance with another feature of the invention, a capacitor is connected in parallel with the assembly comprising the thyristors and the saturable reactor.

In accordance with a further feature of the invention, the thyristor switch comprises a device for detecting the zero points of the current in series with the thyristors, the aforesaid capacitor being in parallel with the assembly comprising the thyristors, the saturable reactor and the said device for detecting the zero points of the current.

In accordance with yet another feature of the invention, the thyristor switch is employed in association with a similar thyristor switch in a synchronous on-load transformer tap-changing switch, and at each tap change, the tap-changing thyristor switch is connected to a neighboring tap in a first phase through a resistor, and then directly.

BRIEF DESCRIPTION OF THE INVENTION

The invention is hereinafter described in detail with reference to the accompanying drawings, in which FIGS. 1 and 2 diagrammatically illustrate two embodiments of the invention.

DETAILED DESCRIPTION OF THE INVENTION

The described switch is employed in a synchronous on-load transformer tap-changing switch, but it is obvious that the invention is applicable to all switches comprising thyristors.

In addition, there is to be understood by "thyristor" any rectifying semiconductor device having controlled conduction.

Figure 1:
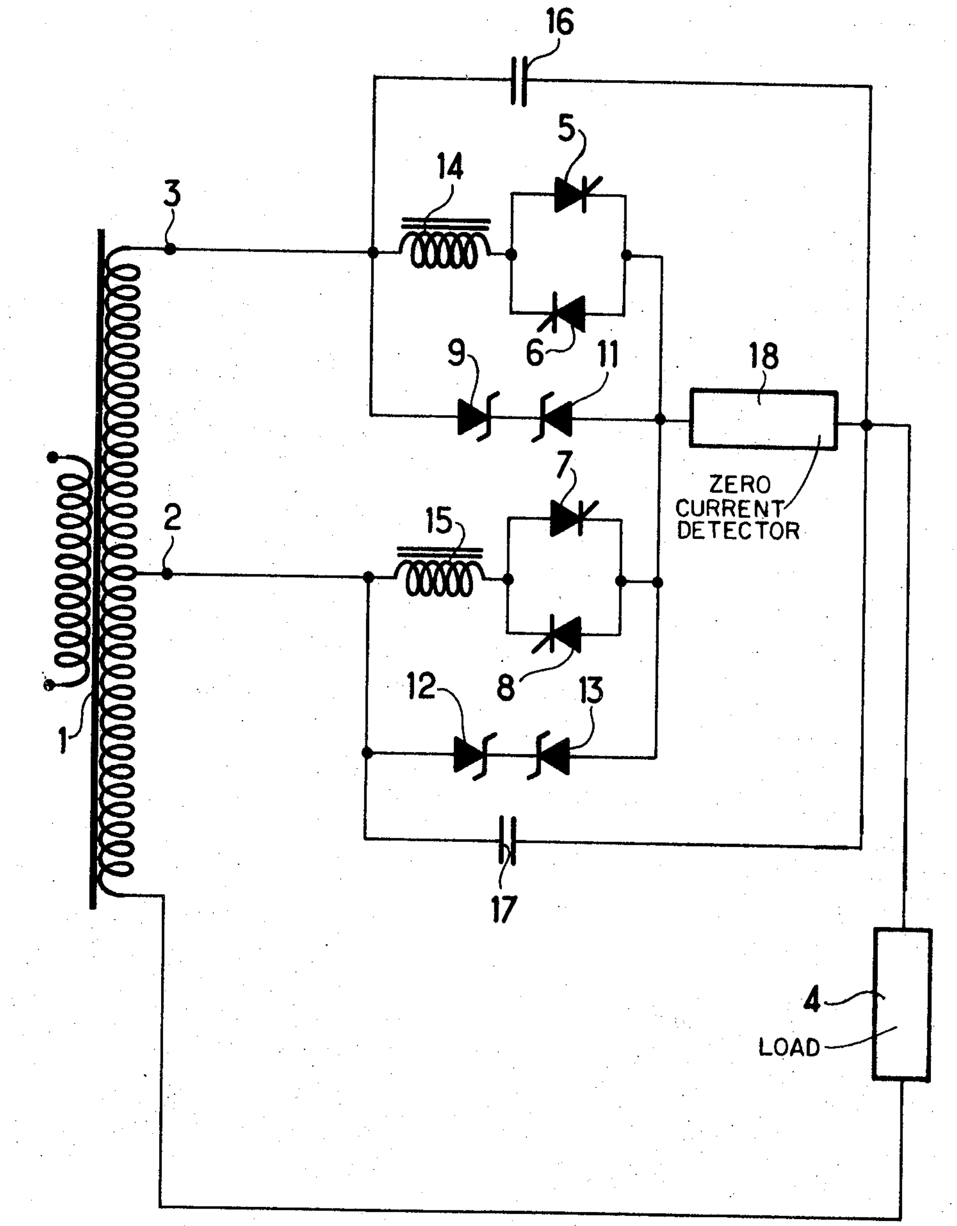

There will be seen in FIG. 1 a transformer 1 having multiple taps, of which only two, 2 and 3, have been shown. It feeds a load 4 connected to each of the two taps 2 and 3 through a thyristor switch consisting of two parallel-connected, oppositely conducting thyristors 5 and 6 (and 7 and 8, respectively), the control circuits of which are not shown.

The two thyristor assemblies are protected against overvoltages by a parallel circuit consisting of two Zener diodes 9 and 11 (and 12 and 13, respectively) arranged in series with opposite conducting directions. Such a switch is described more particularly in British Pat. Specification No. 1,060,638.

In accordance with the invention, there is connected in series with the thyristors 5 and 6 (and 7 and 8, respectively) a saturable reactor 14 (and 15, respectively) having low magnetic losses, the protective Zener-diode circuit being in parallel with the assembly comprising the thyristors 5 and 6 (and 7 and 8, respectively) and the aforesaid saturable reactor 14 (and 15, respectively).

The saturable reactor protects the thyristors against any discharges of the capacitances of the Zener diodes, since the discharge current, for example from the Zener diode 11, which flows through the reactor 14 and then through the thyristor 5 is limited to a low value corresponding substantially to the magnetizing current during a certain time, this time being sufficient for the thyristor concerned to be completely fired. The reactor therefore serves to avoid a too-rapid rise of the discharge current as long as the thyristor is not sufficiently conductive to withstand a high current.

The said saturable reactor obviously protects the thyristors also against rapid current variations due to the tap changing.

The features of the saturable reactor and more particularly its number of turns and the cross section of its magnetic core are determined by the strength to which it is desired to limit the current and the time during which it is to be limited.

In accordance with a particularly advantageous embodiment, the reactor has a magnetic core consisting of ferrite. For example, there can be obtained a limitation of the current to 15 a. during 6 microseconds.

In accordance with another feature of the invention a capacitor 16 (and 17, respectively) is connected in parallel with the thyristors 5 and 6 (and 7 and 8, respectively) and the reactor 14 (and 15, respectively). The capacitance of the said capacitor is tuned with the connecting reactances to a frequency which is sufficiently low for the speeds of voltage variation across the terminals of the thyristors to be lower than the speed at which they are spontaneously fired.

This arrangement makes it possible to increase the times of rise of the voltage across the terminals of the thyristors, i.e., to reduce the maximum value of the derivative with respect to time of the voltage across the terminals of the thyristors when the switch is subjected to a high voltage after having been rendered nonconductive.

It may be seen that the use of the capacitor 16 (and 17, respectively) is possible only due to the saturable reactor 14 (and 15, respectively), which limits the discharge current of the capacitor 16, the capacitance of which is distinctly higher than that of an inversely loaded Zener diode.

The thyristor switch can include a zero current detection device 18 situated in series with the thyristors. Such a device is conventional and is used herein in a known manner to control synchronous switching of the thyristors as described in U.S. Pat. No. 3,340,462. In such a case, the capacitor 16 (and 17, respectively) is advantageously connected in parallel with the assembly comprising the thyristors, the saturable reactor and the said zero-detecting device, since, on small oscillations of the current around the normal zero point, the voltage variations are low and do not reach the threshold value of the protective Zener diodes. The current therefore passes through the capacitor 16 (and 17, respectively) and the zero detector 18 does not detect these untimely passages through zero. This makes it possible to obtain reliability of operation in the case where it is essential to control the conduction of the thyristors at an abnormal passage through zero.

It is then possible, in the case of a synchronous on-load tap changer, comprising certain safety circuits such as those described in the specification of British Pat. application No. 53,880/69, to ensure that the switch operates in certain cases, whereas the said safety devices would prevent it from doing so if the zero detector had "observed" these abnormal passages through zero.

Figure 2:
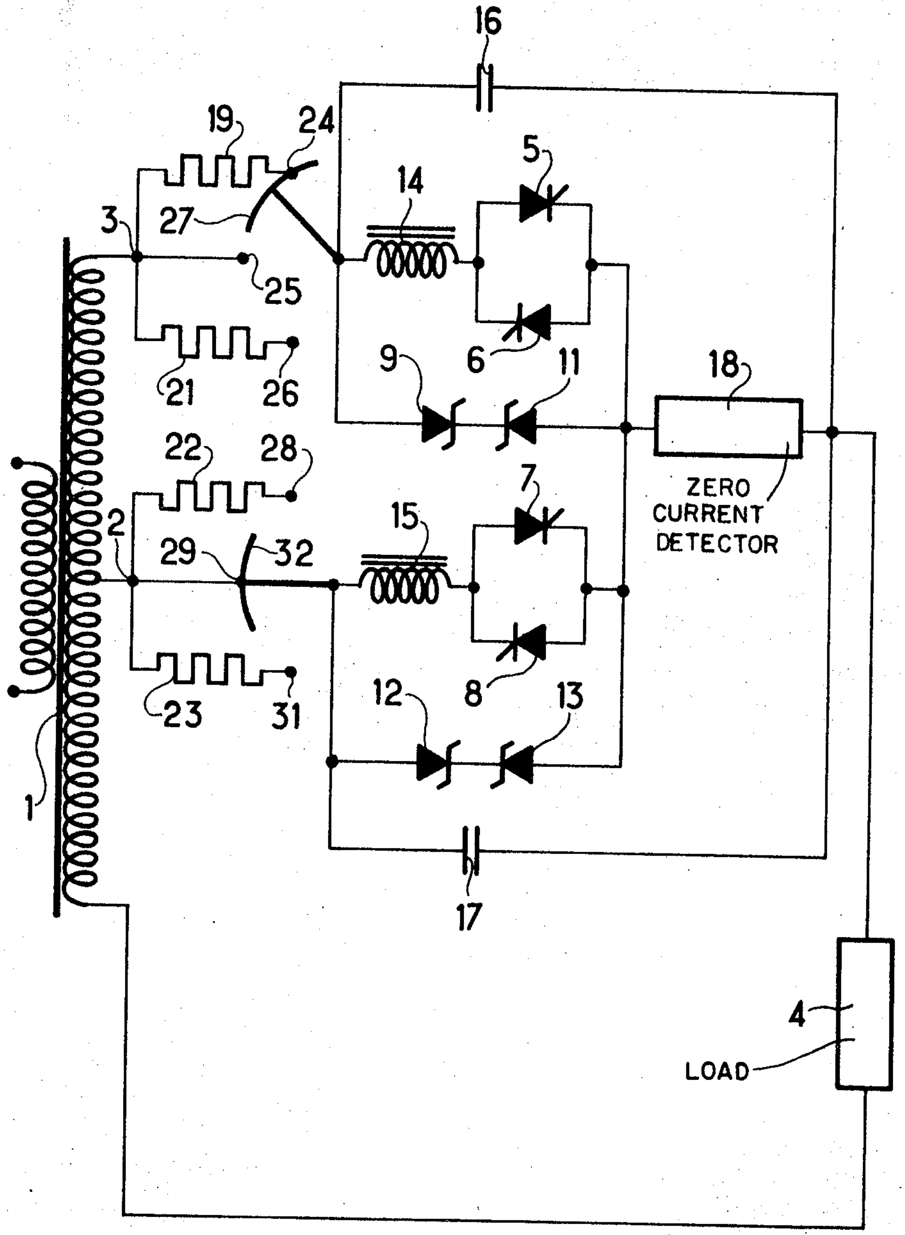

The tap-changing switch illustrated in FIG. 2 is similar to that of FIG. 1 and there will be found therein the same elements denoted by the same references. In addition, each of the switches is connected the taps through a rotary contactor 27

(and 32, respectively). Each terminal comprises three contact studs 24, 25, and 26, of which one, the stud 25, is directly connected to the tap of the transformer and the other two, 24 and 26, are disposed on either side of the stud 25 and are connected to the tap through a resistor 19 (and 21, 22 and 23, respectively).

The width of the movable member 27 (and 32, respectively) is such that the said member may be simultaneously brought into contact with the studs 25 and 24 or 26 (and 29 and 28 or 31, respectively), but not in contact with studs 24, 25 and 26 (28, 29 and 31).

This arrangement makes it possible to apply a progressive voltage to the thyristor switch because in the change of a tap it is first connected to the next tap through a resistor and then directly.

The time constant of the RC circuit consisting of the capacitor 16 (and 17, respectively) and the resistor 19 or 21 (and 22 or 23, respectively) is sufficient to eliminate the rapid variations of the voltage at the thyristors when voltage is applied thereto by the rotary contactor, and thus prevents the switch from being inopportunely rendered conductive.

It will be seen that the invention makes it possible to protect the thyristors completely, because they are protected against rapid current variations owing to the saturable reactor and against voltage variations owing to the capacitor.

What is claimed is:

1. A protection device for a thyristor type switch comprising: a saturable reactor having low magnetic losses connected in series with the thyristor type switch, two Zener diodes connected in opposite directions in series with each other and in parallel with said thyristor type switch and said reactor and a capacitor which is connected in parallel with said thyristor type switch and said saturable reactor.

2. A protection device as claimed in claim 1, wherein said saturable reactor is a coil containing a magnetic core of ferrite material.

3. A protection device as claimed in claim 1, wherein the capacitance of said capacitor is tuned in relation to the reactance of said saturable reactance to a low frequency whereby the speed of voltage variation across the thyristor is maintained lower than the speed at which said thyristor type switch is spontaneously fired.

4. A protection device as claimed in claim 1, further including a device for detecting the zero points of current passing therethrough, said device connected in series with said thyristor and said saturable reactor and said capacitor being connected in parallel with said device as well as with said thyristor type switch and said saturable reactor.

5. A protection device as claimed in claim 1, further including a voltage source, at least one resistor connected in series with said voltage source, a lead directly connected to said voltage source and means to connect said thyristor type switch to said voltage source through said resistor or through said lead.

6. A protection device as claimed in claim 5, wherein said voltage source is a transformer and wherein said thyristor type switch is employed as a tap-changing switch.

7. A protection device as claimed in claim 5, wherein said means to connect said thyristor type switch to said voltage source is a rotary contactor, one terminal of which is connected to said thyristor type switch and the other terminal of which includes three contact studs, one of which studs is directly connected to the voltage source and the other two studs are connected to said voltage source through resistors.

8. A protection device as claimed in claim 6, wherein the time constant of the RC circuit formed by said capacitor and either of said resistors reduces the speed of variation of voltage across said thyristor type switch to a value lower than that at which it is spontaneously fired.

* * * * *